United States Patent [19]
Atkins et al.

[11] Patent Number: 5,934,782
[45] Date of Patent: Aug. 10, 1999

[54] LIGHT GUIDE APPARATUS

[75] Inventors: Richard Keith Atkins; Lee Allan Andrews, both of Essex, United Kingdom

[73] Assignee: Ford Motor Company, Dearborn, Mich.

[21] Appl. No.: 09/200,256

[22] Filed: Nov. 25, 1998

[30] Foreign Application Priority Data

Nov. 29, 1997 [GB] United Kingdom ............... 9725240

[51] Int. Cl.⁶ .................................................. G01D 11/28
[52] U.S. Cl. ......................... 362/26; 362/489; 362/511; 116/288
[58] Field of Search ............................. 116/288; 362/26, 362/31, 489, 511

[56] References Cited

U.S. PATENT DOCUMENTS

| | | |
|---|---|---|
| 4,899,260 | 2/1990 | Schrammek et al. ................ 362/32 |
| 5,047,761 | 9/1991 | Sell ................................... 340/815.1 |
| 5,546,888 | 8/1996 | Skiver et al. ........................ 116/286 |
| 5,703,612 | 12/1997 | Salmon et al. ....................... 362/26 X |

*Primary Examiner*—Stephen Husar
*Attorney, Agent, or Firm*—Raymond L. Coppiellie

[57] ABSTRACT

A light guide apparatus for use on a motor vehicle instrument panel is disclosed. In order to bring as much light as possible into a dial pointer 20, the panel has a translucent plate 22, the front face of which forms the dial face. Light is introduced into the translucent plate through a plurality of light pipes 44, and is then directed into a catchment area 30 for pointer illumination by converging facets 35,38 formed in the plate. The facets are arranged with a wide opening which receives light traveling in the plate and with a tapering or converging area in which the light incident in the wide opening is continuously reflected into the pointer illumination catchment area.

14 Claims, 4 Drawing Sheets

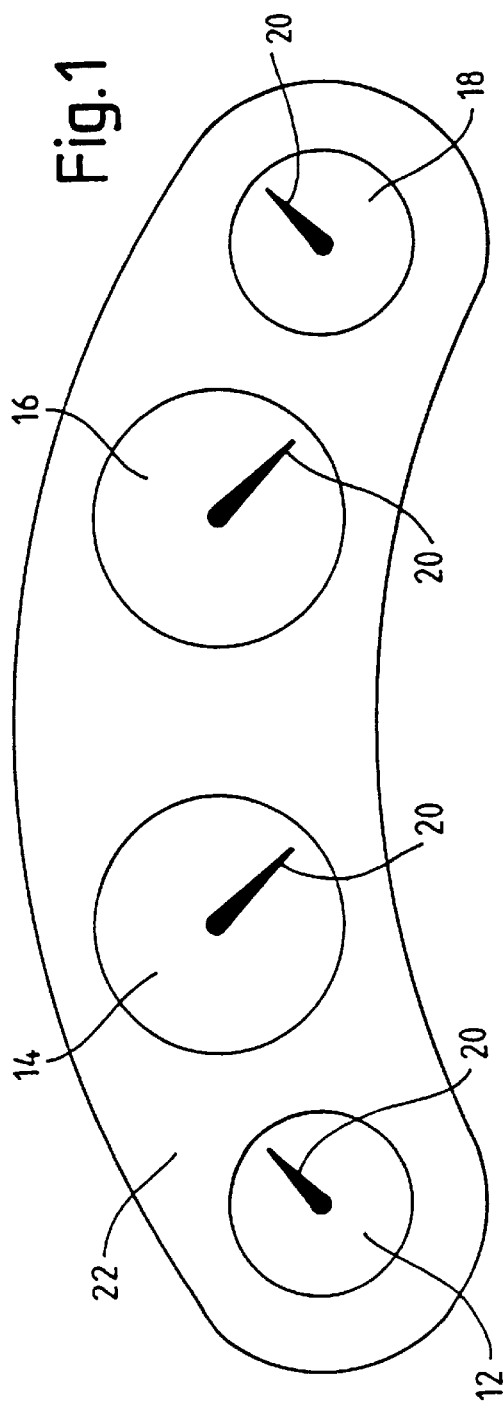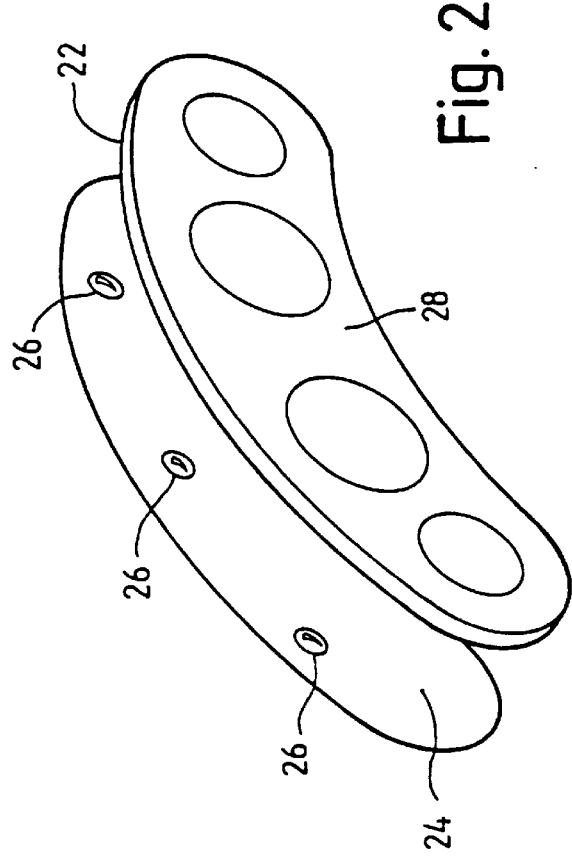

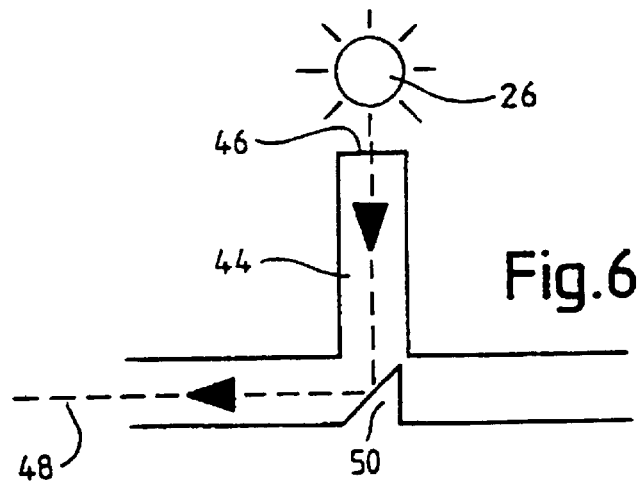
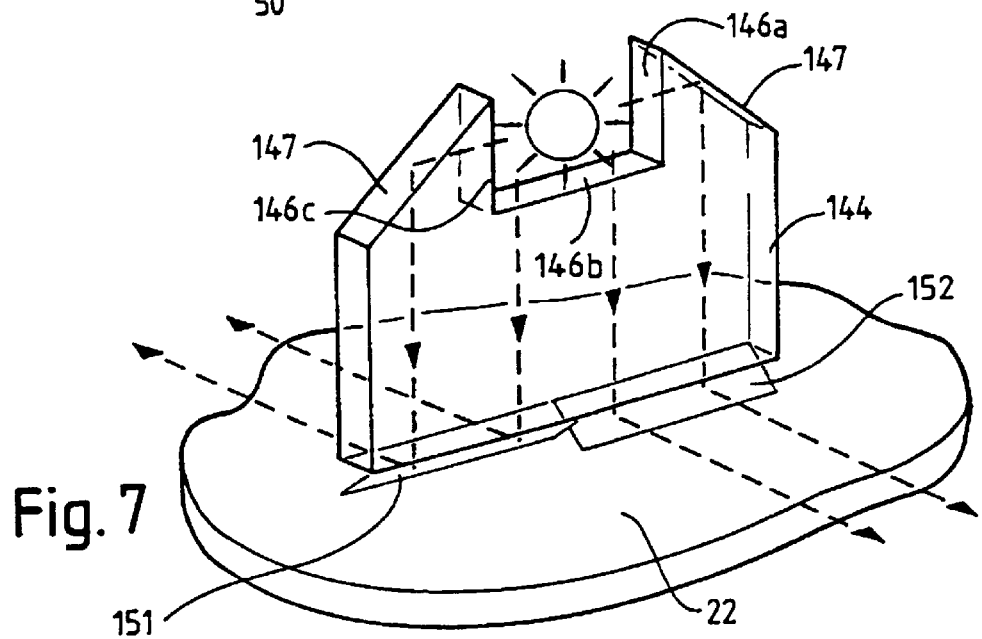
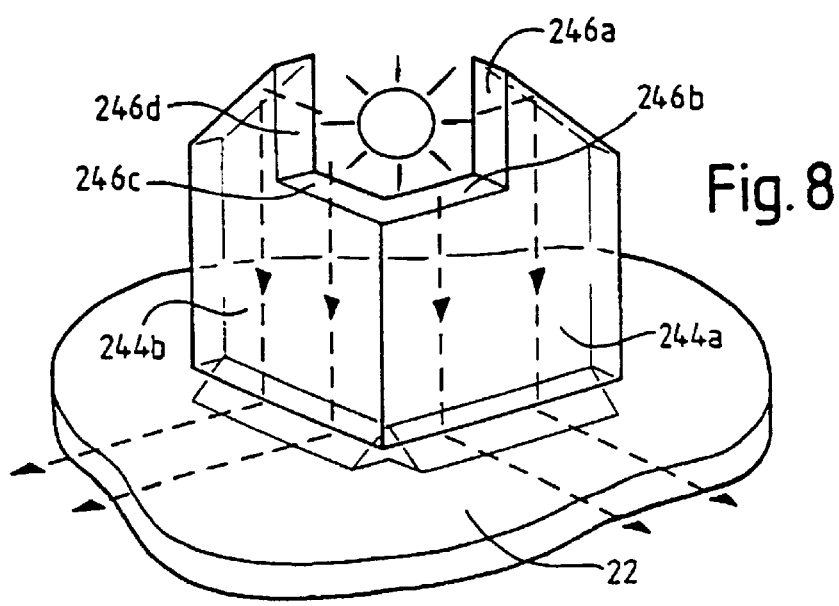

LIGHT GUIDE APPARATUS

BACKGROUND OF THE INVENTION

This invention relates to a light guide apparatus for guiding illumination to parts of a display panel, for example, the dials on a vehicle instrument panel.

The illumination of a vehicle display panel requires clear and even illumination, both across the face of the dial(s) and also along the dial pointer. At the same time, the features used to conduct light to the correct parts of the display should not create visible shadows on the dial graphics and should be capable of being manufactured in a low-cost, efficient manner and they should not add weight to the structure.

SUMMARY OF THE INVENTION

According to the invention, there is provided a light guide apparatus for illuminating pointers on a display panel, the apparatus comprising a molded, translucent plate having a first side, a second side and an aperture disposed therethrough. The first side forms a support for the display panel. The light guide apparatus also comprises at least one pair of converging facets disposed between the first and second sides of the plate, the facets converging towards the aperture and concentrate light incident between said converging facets towards said aperture. The aperture includes angled facets arranged to direct light in a predetermined direction. The light guide apparatus further comprises at least one pointer mounted on a spindle passing through said aperture in the plate. The pointer has light receiving faces facing towards the first side of the plate which receive light to illuminate the pointer. The facets of said aperture are arranged to direct light into the pointer light receiving faces.

The pair of converging facets are able to divert light which would otherwise travel past the aperture, without contributing to the pointer illumination, into the aperture. This can result in increased pointer illumination and/or a reduced specification for the light source.

In one embodiment of the present invention, the converging facets can be the edges of slots formed through the material of the plate. It is an advantage of the present invention that in this way, no extra material has to be added to the plate; indeed material is removed, contributing in a small way to weight reduction. Alternatively the converging facets can be formed by grooves which do not extend entirely through the material of the plate but which have a reflecting face extending a substantial distance through the material of the plate, to reflect light towards pointer illumination apertures.

Preferably the first side of the plate is covered with a coverlay which has some translucent areas and some opaque areas, and the converging facets are all located behind opaque areas of the coverlay. It is an advantage of the present invention that any non-uniformity of illumination over the area of the plate and resulting from the presence of the facets will then be hidden from the front face of the display.

In a preferred embodiment of the invention, it is preferred to have two pairs of converging facets, both of which converge towards the aperture from different directions to concentrate light from two different light sources towards the aperture. The converging facets can be curved with their convex or their concave sides facing one another. However it is also possible for these facets to be straight. In one embodiment, the converging facets are formed by two opposite ends of a single slot formed through the material of the plate.

These and other features and advantages of the present invention will be readily apparent upon consideration of the following detailed description in conjunction with the accompanying drawings.

BRIEF DESCRIPTION OF THE DRAWINGS

The invention will now be further described, by way of example, with reference to the accompanying drawings, in which:

FIG. 1 is a front view of an instrument display for use in a motor vehicle;

FIG. 2 is a schematic perspective view of the display of FIG. 1;

FIG. 6 is a section through a small part of a display, showing a further feature of the invention;

FIG. 7 is a perspective view of the back of a display, showing another feature of the invention;

FIG. 8 is a perspective view of the back of a display, showing yet another feature of the invention.

DETAILED DESCRIPTION OF THE PREFERRED EMBODIMENTS

Figure 3:
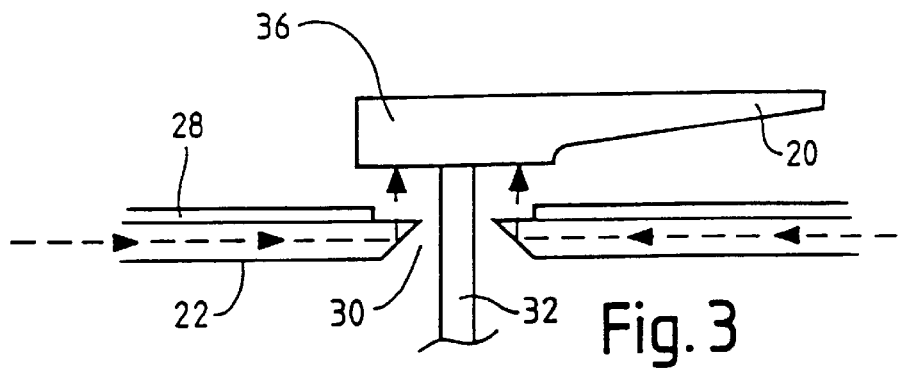
FIG. 3 is a section through a small part of the display of FIGS. 1 and 2.

FIGS. 1 and 2 show part of an instrument cluster 10 which comprises a dial plate 22 on which dials 12, 14, 16 and 18 are positioned. For example the dials may represent fuel level, tachometer, speedometer and coolant temperature in a motor vehicle but it is to be understood that the invention is not limited to application to these particular functions and indeed is not limited to use in a motor vehicle. In use the dial plate 22 will be mounted in a backplate 24 and behind a housing or mask (not shown). The backplate carries various electronic components and additionally carries light sources for the illumination of the plate 22. Three light sources are shown by way of example at 26, these light sources being in the form of light bulbs or LED's. Other forms of illumination are however possible.

The dial plate 22 consists of a molded plastics plate of a transparent, light-transmitting material such as polycarbonate. The plate will be molded to incorporate facets and light pipes, in the manner to be described below. The front face of the dial plate 22 will be covered with a coverlay 28 (see FIG. 3) which carries the graphics for the dial display. Large areas of the coverlay will be opaque, but some areas will be transparent, in particular the index markings around the periphery of each dial, and the index numbers associated with the index markings. When the dial plate 22 is illuminated from behind, the opaque parts of the dial will remain dark, but the translucent areas (i.e., the graphics) will be illuminated by transmitted light.

The plate 22 has apertures 30 through which a spindle 32 of a pointer 20 can pass. The edges of the plate 22 which surround the opening 30 are formed at an angle as can be seen in FIG. 3 and the coverlay 28 stops short of the edge of the top plate of the plate 22 so that light can be reflected by the angled facets 34 up to the underside of the hub 36 of the pointer 20. The angle of the facets 34 will depend on the thickness of the plate 22, but typically will be about 45°. The hub 36 will be of sufficiently large diameter, and sufficiently close to the plate 22 so that light does not leak out from between the hub and the coverlay 28. In other words the diameter of the hole in the coverlay will be less than the diameter of the hub 36.

Figure 4:
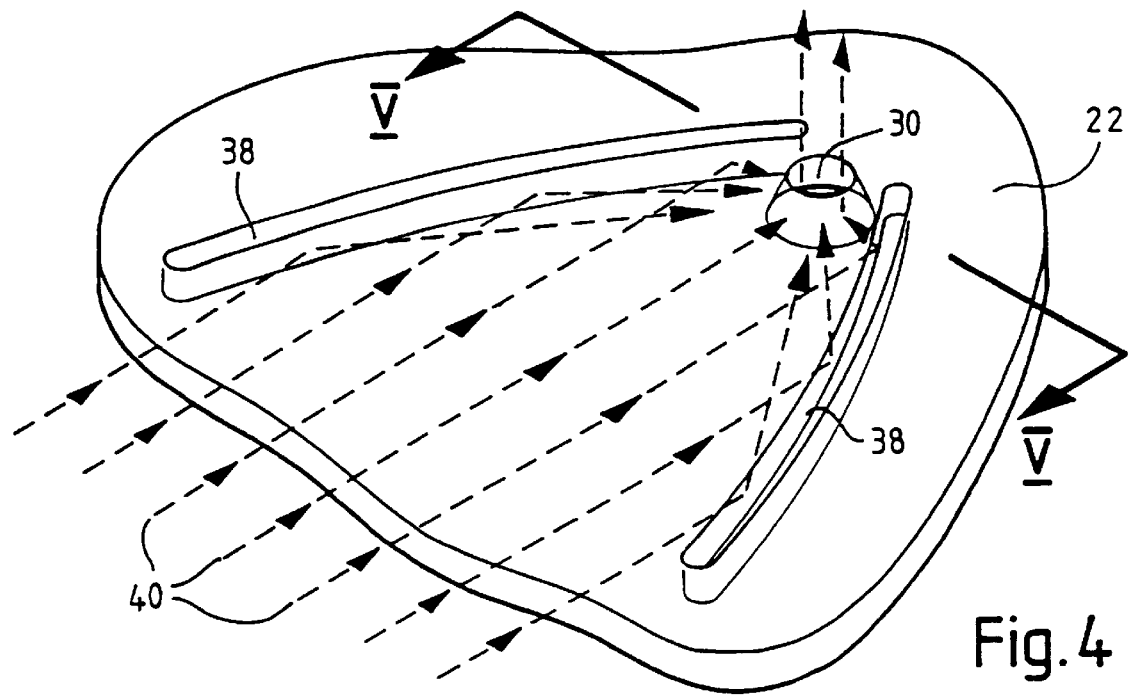
FIG. 4 is a detail view of one face of a display plate in accordance with the invention.

In FIG. 3 and the other drawings, light paths are indicated by dotted lines. FIG. 4 shows a section of a plate 22 with a hole 30 for a gauge spindle. The plate 22 is formed with a pair of slots 38 which extend through the thickness of the plate 22 and which converge towards the position of the aperture 30 for a dial pointer gauge spindle. Incoming light is indicated by dotted lines at 40. All the light which enters the wide opening between the slots 38 will either pass directly to the pointer spindle or, if it impinges on an edge of one of the slots 38, then the light will be internally reflected across the gap between the slots, until the light reaches the edge of the pointer gauge spindle aperture 30.

Figure 5:
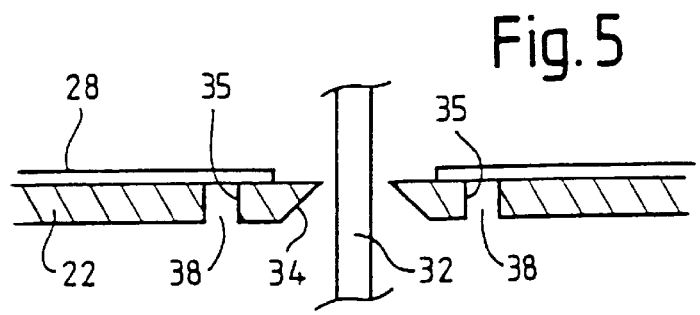
FIG. 5 is a cross-section through the display plate of FIG. 4, on the line V—V.

FIG. 5 shows a cross section on the line V—V, with the slots 38 shown either side of the aperture 30 and the facets 34. In fact it is the inner faces 35 of the slots 38 which provide facets by which incident light is internally reflected within the plate 22, and the light bounces backwards and forwards between the two slots 38 until it reaches the aperture 30.

Figure 9:
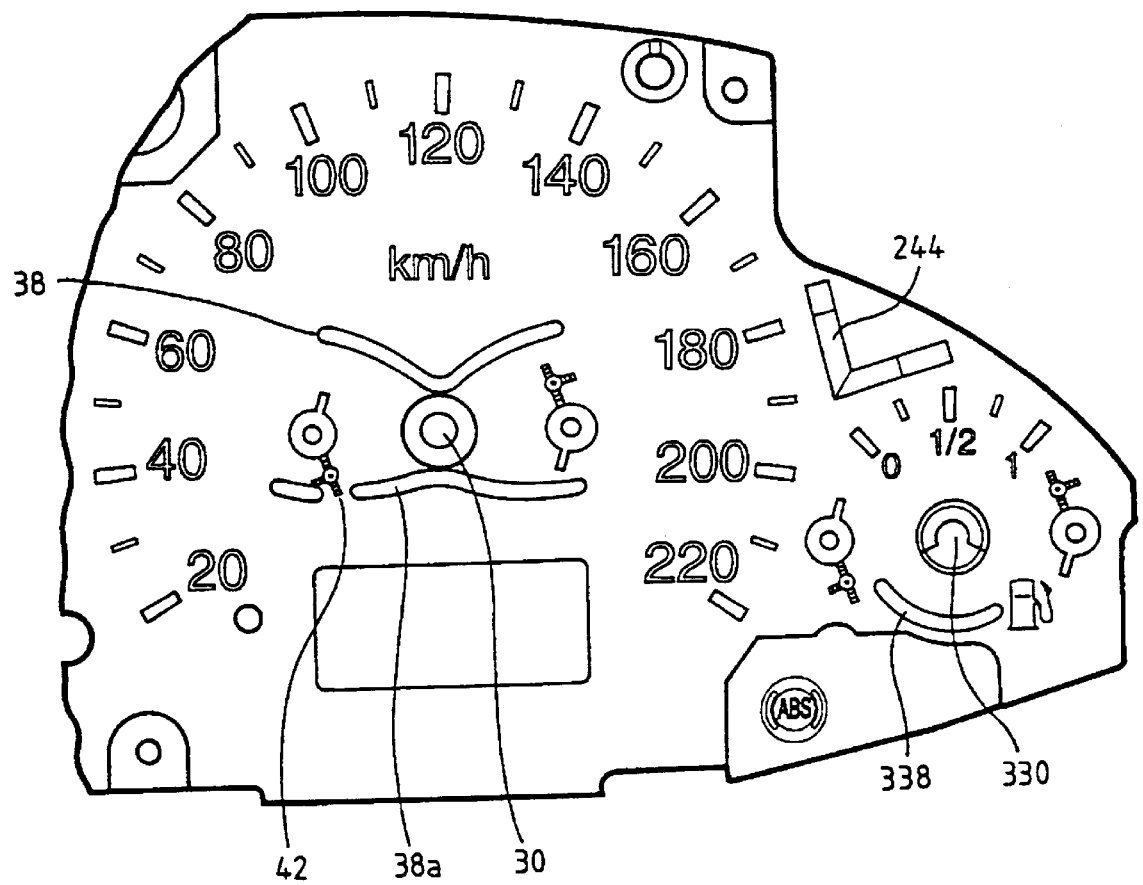
FIG. 9 is a plan view of a vehicle speedometer dial incorporating features of the invention.

The slots 38 can be straight, curved with their convex surfaces facing one another as shown in FIG. 4, or curved with their concave surfaces facing one another as shown in FIG. 9. In FIG. 9, one of the slots 38a is interrupted at 42, because another feature (in this case, a gauge mounting boss) occupies the position where the slot would otherwise be formed. A small amount of captured light may be lost through the gap 42, but the amount of light lost will not be significant.

FIG. 6 shows one type of light pipe at 44, for introducing light into a dial plate 22. The light pipe 44 is a rectangular section extending from the back face of the plate 22, and has a top edge surface 46 which will be perpendicular to at least some of the light being produced by a light source 26. Light which strikes the surface 46 at right angles to the surface or close to this orientation will be directed through the pipe as indicated by the dotted lines 48, and when the light reaches the plate 22 itself it will be incident on a molded in facet 50 by means of which the light will be directed, in this case, to the left where there will be an aperture 30 for a dial pointer where illumination will be required. This feature can be achieved with simple low cost tooling which requires no side coring.

FIG. 7 shows the back face of a dial plate which illustrates an extension of this principle. In this case, the light pipe 144 has a U-shaped recess 145 within which the light source 26 is positioned. The recess 145 therefore has three separate walls 146a, 146b and 146c which can receive perpendicular rays of light, and the paths taken by those lights within the light pipe 144 are indicated by dotted lines. It will be noted that the top surface of the pipe 144 has angled shoulders 147 to internally reflect the light entering through faces 146a and 146c. At the bottom, where the pipe 144 meets the plate 22 there are two opposite angle facets 151 and 152. The facet 151 will divert light striking it in a direction behind the pipe 144, whereas the facet 152 will direct light forward. Thus a feature produced in one piece from simple low cost tooling can reflect light to two different pointer receiving faces.

FIG. 8 shows an apparatus where one light pipe 244 is designed so that it can direct light into directions at 90° to one another. The pipe 244 consists of two walls 244a and 244b at right angles to one another, with light receiving faces 246a, 246b, 246c and 246d. The way in which light is transmitted through these faces is indicated by dotted lines. When the light reaches the plate 22, it can be diverted by a facet similar to facets 50, 151 and 152 either forward of the respective wall 245a, 245b or backwards.

FIG. 9 shows part of a speedometer dial constructed in accordance with the invention. In this drawing, components which have been described with reference to previous drawings bear the reference numerals used in those earlier drawings. Light from a source not shown and to the left of the drawing of FIG. 9 will be received within the left hand converging slots 38, 38a. Light from the left hand wall of the light pipe 244 will be received in the right hand pair of slots 38. Light from the lower wall of the pipe 244 will be received in an aperture 330 for a fuel gauge, and in this instance, an additional slot 338, similar to 38 of FIG. 4 will be made through the material of the plate, to collect stray light which passes the aperture 330 and to reflect that light back to the aperture.

The features described here, alone or in combination, allow the construction of a dial plate for an instrument panel in a low cost efficient manner with excellent light redirection facilities. The features described can be achieved using low cost, simple tooling. It is to be noted in all embodiments, light from the light sources 26 which does not enter a light pipe becomes available to act as back illumination for the non-opaque parts of the coverlay.

It is to be understood that the present invention has been described in an illustrative manner and that the terminology which has been used is intended to be in the nature of words of description rather than of limitation. As those of ordinary skill in the art will recognize, many modifications and variations of the present invention are possible in light of the above teachings. Therefore, it is also to be understood that, within the scope of the following claims, the invention may be practiced other than as specifically described above.

What is claimed is:

1. A light guide apparatus for illuminating pointers on a display panel, the apparatus comprising:

a molded, translucent plate having a first side, a second side and an aperture disposed therethrough, said first side forming a support for the display panel;

at least one pair of converging facets disposed between the first and second sides of the plate which converge towards the aperture and which are operative to concentrate light incident between said converging facets towards said aperture, said aperture having angled facets arranged to direct light in a predetermined direction; and at least one pointer mounted on a spindle passing through said aperture in the plate, the pointer having light receiving faces facing towards the first side of the plate and adapted to receive light to illuminate the pointer, said facets of said aperture being arranged to direct light into the pointer light receiving faces.

2. An apparatus as claimed in claim 1, wherein said plate further includes a pair of slots extending therethrough, each slot of said pair including a circumferentially surrounding edge, and wherein said at least one pair of converging facets comprises said edges of slots.

3. An apparatus as claimed in claim 1, wherein said at least one pair of converging facets are formed within the material of the plate.

4. An apparatus as claimed in claim 1, wherein the first side of the plate is covered with a coverlay, a portion of which is translucent and a portion of which is opaque, and wherein said at least one pair of converging facets are disposed behind said opaque portions of the coverlay.

5. An apparatus as claimed in claim 1, wherein two pairs of converging facets are provided, converging towards the aperture from different directions to concentrate light from two different light sources towards the aperture.

6. An apparatus as claimed in claim 5, wherein the two pairs of converging facets are provided by two slots which each extend on opposite sides of the aperture and which converge toward each other as they approach the position of the aperture from either side.

7. An apparatus as claimed in claim 6, wherein the converging facets are curved having a concave side and a convex side, said concave sides being disposed to face one another.

8. A light guide apparatus for illuminating pointers on a display panel, the apparatus comprising:

a molded, translucent plate having a first side, a second side and an aperture disposed therethrough, said first side forming a support for the display panel;

a slot formed through said plate and configured to form a surface at which light traveling within the plate is totally internally reflected within the plate; and at least one pointer mounted on a spindle passing through said aperture in the plate, the pointer having light receiving faces facing towards the first side of the plate and adapted to receive light to illuminate the pointer, said facets of said aperture being arranged to direct light into the pointer light receiving faces.

9. An apparatus as claimed in claim 8, wherein said slot is curved relative to a point on the plate, so that light reflected from different parts along the length of the slot is directed to that point.

10. An apparatus as claimed in claim 8, further including a plurality of slots, each of which being arranged relative to a predetermined point on the plate, so that light reflected from different slots, or from different parts along the length of one slot, is directed to said predetermined point.

11. An apparatus as claimed in claim 10, wherein the first side of the plate is covered with a coverlay, a portion of which is translucent, and a portion of which is opaque, and wherein said plurality of slots are disposed behind said opaque portions.

12. An apparatus as claimed in claim 11, further including a light pipes molded onto said second side of said plate, said light pipe having a plurality of light receiving faces disposed in more than one plane.

13. An apparatus as claimed in claim 12, wherein said light pipe further includes a plurality of light transmitting channels in more than one plane.

14. An apparatus according to claim 12, wherein said light pipe extends generally perpendicularly from the plane of said second side of said plate and includes a generally U-shaped recess having a pair of vertical walls and a generally horizontal wall disposed therebetween, each of said walls being operative to receive and direct light from a light source.

* * * * *